United States Patent

[11] 3,575,214

[72] Inventor Jerome E. Bindel
     6208 Meadowbrook Ave., Cleveland, Ohio 44144
[21] Appl. No. 832,595
[22] Filed June 12, 1969
[45] Patented Apr. 20, 1971

[54] INSULATED HANGER ASSEMBLY
     9 Claims, 4 Drawing Figs.
[52] U.S. Cl. ................................................. 138/107, 138/149, 248/62
[51] Int. Cl. .................................................. F16l 3/08
[50] Field of Search ..................................... 138/107, 149; 248/60, 62, 63, 74

[56]            References Cited
          UNITED STATES PATENTS
2,215,283  9/1940  Adler .......................... 138/107X
3,006,674  10/1961 Becker ......................... 248/62X
3,185,758  5/1965  Litz ............................ 248/62X
3,194,590  7/1965  Cook ........................... 248/62X
3,493,206  2/1970  Alluo .......................... 248/62
          FOREIGN PATENTS
834,304    3/1952  Germany ....................... 248/63

Primary Examiner—Herbert F. Ross
Attorney—Bosworth, Sessions, Herrstrom and Cain ABSTRACT: An insulated hanger assembly for supporting an insulated pipe or the like, comprising a hanger member including a metal bracket, adapted to surround and directly contact an exposed, bared section of the pipe between sections of conventional insulation and a rod that extends from the bracket to secure it to a support. A premolded, insulating shell encompasses at least a part of the rod or other interconnecting means and extends around at least part of the strap, to cover and insulate such parts. Also the shell is shaped to fit adjacent the bared section of the pipe to insulate it, and preferably overlaps and engages contiguous portions of the conventional pipe insulation.

PATENTED APR20 1971  3,575,214

INVENTOR.
JEROME E. BINDEL
BY Bosworth, Sessions,
Henstrom + Cain
ATTORNEYS.

INSULATED HANGER ASSEMBLY

BACKGROUND OF THE INVENTION

The present invention relates to a hanger assembly for suspending pipes of the like having a covering of insulating material, in which assembly the insulation is not crushed and in which the assembly itself is at least partially heat insulated.

In many industrial applications, various pipes, conduits, tubes and the like are designed to convey hot or cold materials such as steam, hot oil, a coolant, refrigerant, chilled water, etc. It is common practice to insulate such pipes not only to maintain the conveyed material as near as possible to desired temperature, but also, in the case of cold materials, to prevent "sweating" which occurs because of condensation of ambient moisture on a cool pipe surface, sometimes with attendant rusting of parts.

To achieve a maximum insulating effect, it has been the usual practice to insulate the entire length of the pipe and place a hanger on the outside in contact with the insulation. Consequently, the insulation itself acts as a structural member in supporting the pipe. The portions of such hangers contacting the insulation normally are of relatively narrow width, resulting in large stress concentrations over a small area of the insulation. Since thermal pipe insulation is by nature porous and fragile, the concentration of pressures over a relatively small area frequently crushes the insulation. In time, often aided by vibration or jarring of the pipe, the crushed area continues to deteriorate, forming not only an unsightly appearance but, more seriously, materially reducing the desired insulating effect.

SUMMARY OF THE INVENTION

In accordance with one form of the present invention, a strap or band type of hanger bracket passes around an exposed or bared section of an insulated pipe to make direct contact with it. In this manner, the pipe insulation is not used as a structural member and is never either in compression or tension. To provide a bared section, the pipe insulation may be cut away, or the insulation may be otherwise spaced apart to leave the exposed section of pipe. A hanger rod or shank extends from the bracket to secure it to a ceiling or other overhead support. A premolded, insulating shell, preferably of foamed or cellular resinous material, covers a substantial portion, if not all, of the hanger rod and extends around the bracket to cover and thereby insulate it. The insulating shell is shaped to fill and thereby also insulate the balance of the exposed, bared section of the insulate pipe. In a preferred form, the insulated shell is shaped to extend over and rest upon contiguous portions of the spaced apart sections of the insulation totally to enclose the bracket and a portion of the rod.

In a modified form, the insulating shell extends only part way, for example about half way, around a pipe to enclose the upper portion of the strap type supporting bracket and at least part of rod or shank member. In this case also, the separate, premolded insulator may fit over the ends of the normal insulation encasing the pipe but which is spaced-apart to form the bare area. A shape-conforming section of insulating material then encloses the lower part of the exposed section of the pipe and the bracket and meets the premolded insulating part to which it is secured, as by gluing, in order completely to enclose the bracket and exposed section of the pipe.

DESCRIPTION OF THE DRAWINGS

The accompanying drawings illustrate embodiments of the invention in which.

DESCRIPTION OF THE PREFERRED EMBODIMENTS

Figure 1:
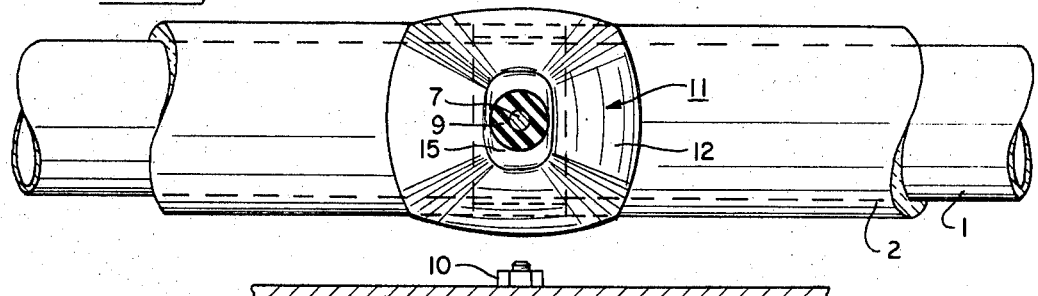
FIG. 1 is a plan view of an insulated pipe having an insulated hanger assembly of the present invention.
Figure 2:
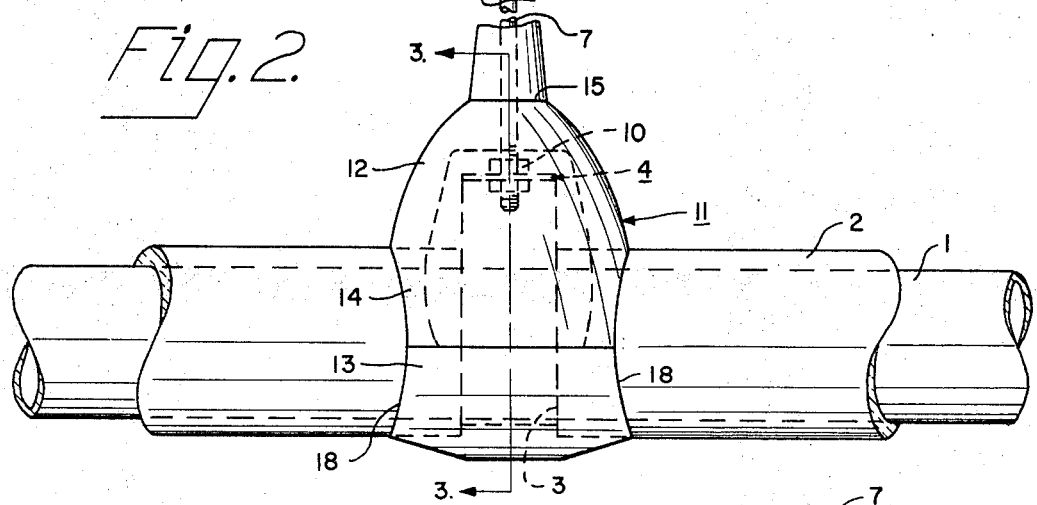
FIG. 2 is a side elevation of the pipe and hanger assembly of FIG. 1 and shows a rod attachment to a support.
Figure 3:
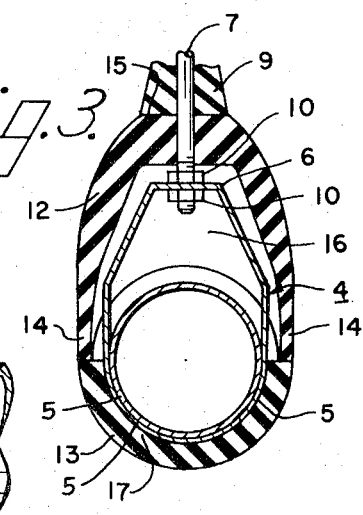
FIG. 3 is a partial section of FIG. 2 on the line 3—3.

Referring initially to FIGS. 1 through 3, the embodiment illustrated includes pipe 1 having abutting arcuate sections of standard insulation 2, such as magnesia, fiber glass, or asbestos insulation. Either by cutting out an annular section of the insulation 2 or by spacing apart preformed sections of the insulation, an exposed bared section 3 is formed. A metal strap or band 4 is closed upon itself and secured as by welding or bolts to form a hanger bracket generally indicated at 4. As shown in FIG. 3, the bracket has a curved bottom section 5 matching the curvature of the pipe 1 and in which the pipe 1 nests; and a top section formed of straight sides defining a horizontal section 6 which is vertically spaced from the upper portion of the pipe. A shank member such as a rod 7 secures the hanger bracket 4 to an overhead support. In the form illustrated, the rod 7 has threaded ends, one of which passes through a suitable opening in the horizontal section 6 of the hanger member, and the other of which passes through a suitable opening in a plate 8 which may be part of a ceiling, sill, or the like. At each end of the rod 7, a pair of cooperating conventional nuts 10 straddle the horizontal bracket section 6 and the plate 8, respectively, to lock the rod 7 rigidly with respect to those parts.

A premolded insulating shell generally represented at 11 comprises two cooperating, joined sections, namely at upper section 12 and a lower section 13. Each section preferably consists of a foamed resinous material, such as foamed polystyrene, foamed polyesters, and the like. If desired, such materials may be reinforced with glass fibers. An especially preferred insulation is foamed, closed-celled resinous materials like polyurethane and synthetic rubbers, such as Buna S and Buna N rubbers, which not only have desirable heat-insulating properties but resist absorption of moisture in view of their closed-celled structures.

Upper section 12 has a general U-shape with downwardly extending legs 14 which gradually narrow in thickness. A central or bright portion 15 has an opening to pass the rod 7 and sides which extend to the pipe 1 and, in cooperation with the legs 14, terminate in a convex curvature matching that of the insulated pipe, so as to seat snugly on the insulation transversely of the pipe. Internally of section 12, the two opposite sides of the central portion 15 are spaced so as to define a pocket 16 (FIG. 3) to house the upper portion of the bracket 4 and especially the horizontal band 6.

It will be noted that in this form of the invention, the pocket 16 formed within upper section 12 is of such width that the section straddles the open or bared section 3 on the pipe and rests upon contiguous portions of the insulation 2.

Lower section 13 is substantially, uniformly U-shaped to fit around the curved bottom section 5 of the bracket 4 and abuts against the ends of legs 14 of the upper section so as preferably to form a smooth continuation thereof. The two sections 12 and 13 may be suitably joined together as by gluing or taping together the joined ends.

As shown best in FIGS. 2 and 3, section 13 preferably has an inwardly raised semicircular band 17 of such size as to fit over the curved bottom section 5 of the bracket 4 and fill the balance of the bare opening 3 around the pipe 1. In the form illustrated, section 13 also has semiannular wings 18 extending in opposite directions from the semicircular band 17 and covering the contiguous portions of the pipe insulation 2 to a degree necessary to align its vertical sides with those of the upper section 12 and thereby provide a desired smooth continuation.

If desired, an additional, tubular insulating section 9 may be used to cover any part of the rod 7 not covered by section 12. Section 9 may be composed of the same materials as section 12 or 13.

Figure 4:
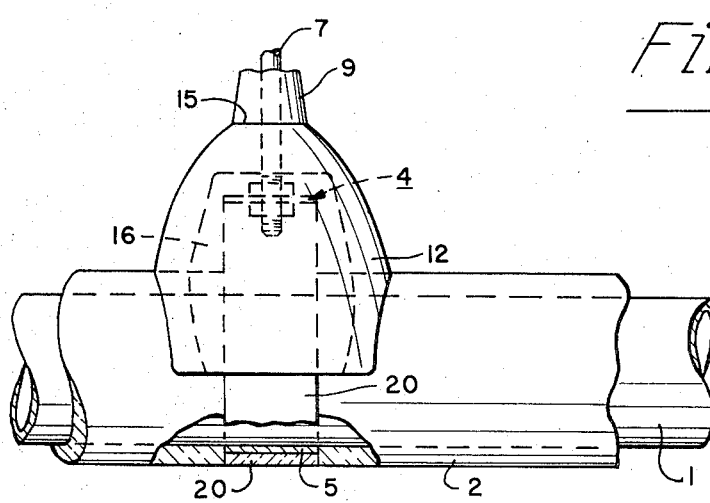
FIG. 4 is a side elevation similar to FIG. 2 but illustrates a modified form of the insulated hanger assembly.

FIG. 4 illustrates a modification in which substantially all of the parts of the embodiment of FIGS. 1 through 3 except the lower section 13 have been used and are therefore indicated by like reference numerals. In place of section 13, a semicircular fill section 20 of standard insulation, which may be of the same type as insulation 2, is cut to fit over the curved bottom section 5 of the bracket 4 and shaped to fill and insulate the balance of the bared pipe section 3. Preferably the outside diameter of fill section 20 is substantially the same as that of the insulated pipe 1, so that there is a smooth, continuous outer surface as illustrated in FIG. 4.

In either embodiment, the bracket 4 bears the weight of the pipe 1 and insulation 2 without in any degree transmitting the weight to the insulation. Yet the present hanger assembly is itself insulated including a substantial portion, if not all, of the hanger rod or shank portion and thereby avoids undesirable loss of heat through conductance and/or radiations even though the hanger directly contacts the bare pipe. In a like manner, the present hanger assembly obviates the use of saddles or similar support members designed to bear against the outside of pipe insulation and which often lead to crushing of the insulation and loss of insulating value.

In one form, a premolded insulator encloses at least a portion of the hanger rod or the like and the entire circumferential area of the pipe embraced by a bracket, with portions of the insulator overlapping and resting upon conventional insulation covering adjacent parts of the pipe. In another form of the invention, the preformed insulator encloses at least part of the hanger rod and overlaps adjacent portions of the conventional insulation but extends only partially around the pipe. In this case, a cutout insulating insert is fitted into the remaining exposed pipe area, completely to insulate the balance of the uncovered hanger strap and pipe.

Although such terms as upper, lower, horizontal, vertical, and the like have been used herein, it is understood that these terms are used only in a relative sense; for example, with respect to the disposition of the pipe and parts as illustrated by FIGS. 1 through 3.

While the foregoing describes several embodiments of the invention, it is understood that other modifications may be made within the scope of the following claims.

I claim:

1. Apparatus of the character described for supporting and insulating a pipe or the like having a layer of insulation surrounding said pipe and also having an exposed bared section free of said layer of insulation between adjacent sections of insulation layer, said apparatus comprising a hanger member including a bracket with the inner surface thereof contacting and bearing against substantially the axial extent of said exposed bared section of said pipe, a shank portion extending from the bracket adapted to secure said bracket to a support, and a preformed insulating shell encompassing at least part of said shank portion and extending entirely around said bracket completely to cover and insulate said encompassed part of said shank portion and said bracket, and to cover and insulate said bared section of the pipe, said preformed insulating shell being of a size to extend longitudinally of the pipe on both sides of said bared section and overlap and engage contiguous portions of said adjacent sections of insulating layer on the pipe, so that the bared portion of the pipe, said bracket and said encompassed part of said shank portion are substantially completely insulated against heat transfer.

2. The apparatus of claim 1 wherein said bracket is formed from a metal strap, and said shank portion is secured to the upper portion of said bracket.

3. The apparatus of claim 1 wherein said bracket is formed by metal strap, said shank portion is secured to the upper portion of said bracket, and said premolded insulating shell has a pocket to house said upper portion of said bracket.

4. The apparatus of claim 1 wherein said premolded, insulating shell comprises a foamed resinous composition.

5. The apparatus of claim 1 wherein said premolded insulating shell comprises a closed-celled, foamed resinous material selected from the group consisting of polyurethane and buna rubbers.

6. The apparatus of claim 1 wherein said premolded, insulating shell comprises two mating sections extending longitudinally of the pipe and secured together.

7. The apparatus of claim 1 wherein said premolded, insulating shell is adapted to extend only part way around said hanger member, and said apparatus includes an insulating section shaped to insulate the balance of said bared section of the pipe and secured to said bared section of the pipe and secured to said insulating shell.

8. In combination: an insulated pipe or the like having an exposed, bared section between sections of insulation, and an insulated hanger assembly comprising a metal strap shaped essentially in the form of a bracket and substantially the entire axial extent of said bared section of the pipe, a shank portion extending from the bracket capable of securing said metal strap with respect to a support, and a premolded, insulating shell of cellular material encompassing at least part of said shank portion and substantially completely covering the exterior of said metal strap to insulate it, said shell being shaped to fill the bared section on the pipe and to extend over and contact contiguous portions of said sections of insulation.

9. The apparatus of claim 1 wherein said preformed insulating shell overlaps and engages said contiguous portions of said sections of pipe insulating layer throughout the circumferences of said sections.